(12) United States Patent
Keβler et al.

(10) Patent No.: US 9,048,772 B2
(45) Date of Patent: Jun. 2, 2015

(54) METHOD AND DEVICE FOR OPERATING AN ELECTRIC MOTOR

(75) Inventors: Erwin Keβler, Bad Saulgau (DE); Wolfgang Schulter, Meersburg (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 64 days.

(21) Appl. No.: 13/513,748

(22) PCT Filed: Dec. 2, 2010

(86) PCT No.: PCT/EP2010/068743
§ 371 (c)(1),
(2), (4) Date: Aug. 14, 2012

(87) PCT Pub. No.: WO2011/067337
PCT Pub. Date: Jun. 9, 2011

(65) Prior Publication Data
US 2012/0306421 A1 Dec. 6, 2012

(30) Foreign Application Priority Data

Dec. 3, 2009 (DE) .................. 10 2009 056 784

(51) Int. Cl.
| | |
|---|---|
| *G05B 5/00* | (2006.01) |
| *H02P 29/00* | (2006.01) |
| *G10K 11/178* | (2006.01) |
| *H02P 7/29* | (2006.01) |

(52) U.S. Cl.
CPC .......... *H02P 29/0038* (2013.01); *G10K 11/178* (2013.01); *G10K 2210/129* (2013.01); *H02P 7/29* (2013.01)

(58) Field of Classification Search
CPC ...... D06F 37/203; G05D 19/02; H01H 35/00; H02H 5/00; A47G 19/2227; G01M 13/028; G01M 13/045; H04B 10/25751; H04B 10/1143
USPC ................................... 318/460.445
See application file for complete search history.

(56) References Cited

U.S. PATENT DOCUMENTS

| | | | | |
|---|---|---|---|---|
| 4,677,677 | A | 6/1987 | Eriksson | 381/71.11 |
| 5,662,136 | A * | 9/1997 | Drzewiecki et al. | 137/14 |
| 6,912,289 | B2 * | 6/2005 | Vonlanthen et al. | 381/312 |
| 7,251,301 | B2 * | 7/2007 | Chen et al. | 375/346 |

(Continued)

FOREIGN PATENT DOCUMENTS

| | | | | |
|---|---|---|---|---|
| DE | 3874395 | * | 2/1993 | H02K 33/14 |
| DE | 3874395 T2 | | 2/1993 | H02K 33/14 |

(Continued)

OTHER PUBLICATIONS

Translation of DE3874395 is used in this office action.*

(Continued)

*Primary Examiner* — Shawki S Ismail
*Assistant Examiner* — Zoheb Imtiaz
(74) *Attorney, Agent, or Firm* — King & Spalding L.L.P.

(57) ABSTRACT

A method for operating an electric motor is provided, wherein a motor actuating signal is generated and transmitted to the motor. In order to reduce the noise generated by operating the motor, a suitable additional signal is generated and overlaid on the motor actuating signal when the motor actuating signal is transmitted to the motor.

18 Claims, 1 Drawing Sheet

(56) References Cited

U.S. PATENT DOCUMENTS

| | | | |
|---|---|---|---|
| 2005/0125114 A1* | 6/2005 | Atmur | 701/22 |
| 2009/0022401 A1* | 1/2009 | Huang | 382/190 |
| 2009/0153090 A1* | 6/2009 | Ishihara et al. | 318/503 |
| 2009/0284196 A1 | 11/2009 | Kuo et al. | 318/400.04 |
| 2011/0033322 A1 | 2/2011 | Barthel et al. | 417/410.1 |

FOREIGN PATENT DOCUMENTS

| | | | |
|---|---|---|---|
| DE | 4140329 A1 | 6/1993 | F02M 37/08 |
| DE | 102008018818 A1 | 10/2009 | H02P 7/00 |
| DE | 102009056784 A1 | 6/2011 | H02P 7/29 |
| EP | 0471290 B1 | 11/1997 | G10K 11/178 |
| FR | 2613149 A1 | 9/1988 | H02K 33/14 |
| WO | 93/19458 A1 | 9/1993 | B60L 9/02 |
| WO | 2011/067337 A1 | 6/2011 | G10K 11/178 |

OTHER PUBLICATIONS

German Office Action for Application No. 10 2009 056 784.4-32 (3 pages), Sep. 24, 2010.

International Search Report and Written Opinion for Application No. PCT/EP2010/068743 (11 pages), Apr. 11, 2011.

* cited by examiner

METHOD AND DEVICE FOR OPERATING AN ELECTRIC MOTOR

CROSS-REFERENCE TO RELATED APPLICATIONS

This application is a U.S. National Stage Application of International Application No. PCT/EP2010/068743 filed Dec. 2, 2010, which designates the United States of America, and claims priority to German Application No. 10 2009 056 784.4 filed Dec. 3, 2009, the contents of which are hereby incorporated by reference in their entirety.

TECHNICAL FIELD

The present disclosure relates to the operation of electric motors and in particular a method of operating an electric motor, in which a motor drive signal is generated and transferred to the motor directly or indirectly (via a motor driver).

BACKGROUND

Noise occurring during such a mode of operation is perceived as particularly disturbing in many areas. This particularly applies to the area of vehicle technology for operating noise of electromechanically driven vehicle components (e.g. electric window lifters) or electrohydraulically driven vehicle components (e.g. automatic hood of a cabriolet). In order to reduce this interference noise, the electric motors are often mounted on elastic elements for damping a transfer of noise in solids and/or are at least partly encased in sound damping, the latter often together with parts of a drive mechanism (e.g. a gearbox). Such insulation devices are particularly suitable for attenuating higher frequency components in the spectrum of the noise. For lower frequencies such insulation devices are large, bulky and expensive.

From the prior art, moreover, the method of the controlled compensation of background noise by active superposition of noise with opposite phase (antinoise) is known. Such active noise attenuation is described e.g. in U.S. Pat. No. 4,677,677 and EP 0 471 290 B1.

However, the range of applications of such active systems for noise suppression, frequently also known as ANC ("Active Noise Cancellation") systems, is limited in practice.

Apart from the cost of assembly or placement of a device for the active generation of antinoise (loudspeaker), there is a serious fundamental problem in that destructive interference of background noise and antinoise can usually only be achieved for more or less small geographic areas, but not for a long-range environment around the relevant noise sources. Thus such known active noise suppression systems, for example, are hardly suitable for compensation of the operating noise of an electric window lifter in the entire passenger compartment in a motor vehicle. A practical application also fails in this case because a sound sensor that is required for this purpose (microphone) cannot be arranged in a position (e.g. on a passenger's head), which would be particularly suitable for optimal operation of the system. Finally, the functionality of known active noise suppression systems is also adversely affected by the quite frequently occurring circumstance that there is not only one well localized sound source, but multiple spatially distributed sound sources. In this case, in particular mechanical transmission devices are to be considered, which are driven by the electric motor concerned and are therefore arranged after it.

SUMMARY

In one embodiment, a method of operating an electric motor is provided, in which a motor drive signal is generated and transferred to the motor or a motor driver, wherein an auxiliary signal suitable for reducing noise generated by motor operation is generated and superimposed on the motor drive signal during its transfer to the motor or to the motor driver.

In a further embodiment, the auxiliary signal is generated using a sound signal detected by means of a sound sensor. In a further embodiment, the auxiliary signal is generated using a vibration signal detected by means of a vibration sensor. In a further embodiment, the auxiliary signal is generated using the motor drive signal and/or a signal correlated with it. In a further embodiment, the manner of using the motor drive signal or the signal correlated with it during the generation of the auxiliary signal is varied depending on at least one motor operating parameter. In a further embodiment, the motor is a DC motor. In a further embodiment, the motor drive signal is transferred to a PWM motor driver, which generates from it a PWM voltage to be transferred to the motor.

In another embodiment, an apparatus is provided for implementing any of the methods disclosed above, the apparatus comprising a drive device for generating a motor drive signal and a drive path for transferring the motor drive signal to an electric motor or to a motor driver, and a controller for generating an auxiliary signal and a superimposition device arranged in the drive path for superimposing the motor drive signal and the auxiliary signal.

In a further embodiment, the apparatus also comprises a sensor for detecting a sound signal, on the basis of which the controller generates the auxiliary signal.

In another embodiment, an adjustment arrangement for a vehicle includes the following features: an automatically operable vehicle component; an electric motor, which interacts mechanically with the vehicle component to actuate it; and an apparatus as claimed in one of the claims 8 or 9 for driving the electric motor.

BRIEF DESCRIPTION OF THE DRAWINGS

Example embodiments will be explained in more detail below with reference to figures, in which.

DETAILED DESCRIPTION

Figure 1:
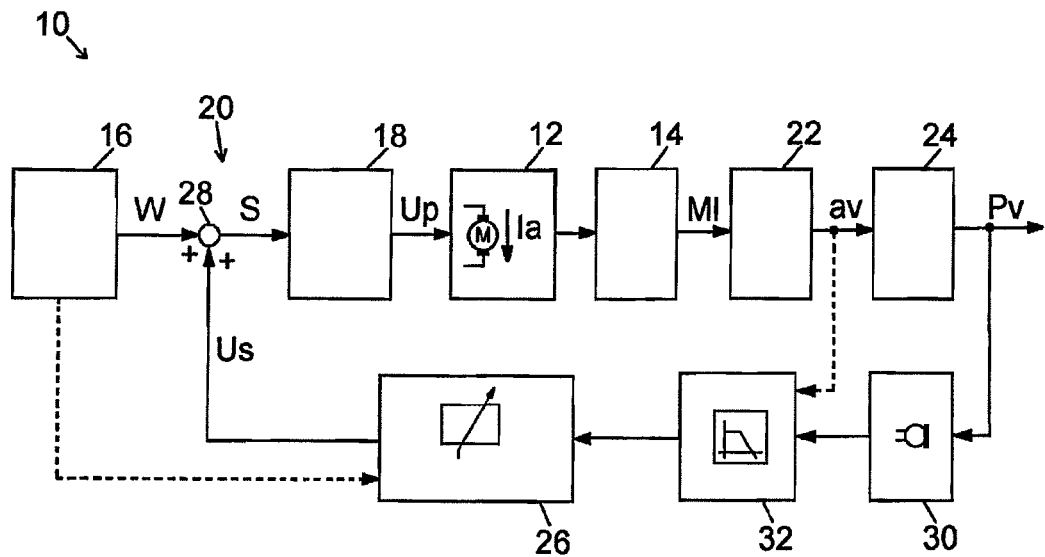
FIG. 1 a block diagram of an example system for operating an electric motor, according to one embodiment, FIG. 2 a representation for illustration of interfering noise generation through the operation of the electric motor of FIG. 1, and FIG. 3 a representation for illustration of a reduction of generated interfering noise, according to an example embodiment.

Some embodiments provide a novel way to reduce interference noise generated by motor operation, whereby the solution may be suitable, e.g., for long-range noise suppression and for applications with spatially distributed interference noise sources.

In some embodiments, an auxiliary signal suitable for reducing noise generated by motor operation is generated and superimposed on the motor drive signal during its transfer to the motor.

Certain embodiments make use of the concept that the already present electric motor is not exclusively used for drive purposes, but also as an "actuator" in order to achieve noise suppression by suitable control of this actuator. In this respect, certain embodiments are similar to known active noise cancellation systems, but in contrast to such systems, require no (loudspeaker) device for generating antinoise.

Further, in some embodiments, the "actuator" used for noise reduction also requires no electrical cabling, because the control signal provided for actuator operation is simply superimposed as an "auxiliary signal" on the actual motor drive signal. The auxiliary signal is thus transferred together with the motor drive signal without any extra cost over an already present electrical cable system to the motor (or motor driver).

Moreover, in some embodiments, the interference noise can already be counteracted at the original location of its generation (electric motor), so that on the one hand a particularly long-range noise suppression can already be implemented according to the physical principle, and on the other hand the otherwise present problem of spatially distributed noise sources is also reduced. That is to say, if the electric motor is already generating less noise, especially noise in solids, then this correspondingly reduces the stimulation of vibrations in downstream mechanical components (e.g. a gearbox or similar), even before these vibrations can cause particularly disturbing airborne sound generation.

In contrast to a conventional ANC system with a separate actuator for the generation of antinoise, embodiments disclosed herein allow such a separate actuator to be dispensed with and the electric motor itself can be used as the actuator. Here the noise spectrum can be cancelled, by superimposing the auxiliary signal, e.g., selectively for single frequencies where otherwise a disturbing resonant noise development would occur.

Drive motors are frequently operated by means of a PWM drive. According to certain embodiments the option can be used here to superimpose an alternating signal on the normal drive voltage for operating the motor, which is generated in such a way that a reduction occurs in the emitted operating noise. In one embodiment this superimposition already takes place before the PWM motor driver. For example, PWM motor drivers are known to which an analog voltage value is input as a motor drive signal, which defines the PWM duty cycle of the PWM motor drive signal (PWM voltage) to be output from the PWM motor driver then to the motor. Here the auxiliary signal can therefore be superimposed as early as on the input signal of the motor driver.

However, it cannot be ruled out that in some embodiments, even in the case of a motor driver, the superimposition only takes place after this motor driver. For a PWM drive of the above-mentioned type this would mean that the auxiliary signal (auxiliary voltage) is superimposed on the PWM motor drive signal (PWM voltage) output by the PWM motor driver.

There are various possibilities for the specific manner of generation of the auxiliary signal.

An objective of the generation of the auxiliary signal includes taking into account the electromechanical transfer function of the "actuator" implemented by the electric motor, i.e., the characteristic of the conversion of the auxiliary electrical signal into "auxiliary mechanical signals or vibrations", generating an auxiliary signal that causes at least partial compensation of the unwanted mechanical signals or vibrations caused by the drive signal, which is provided essentially only to drive the electric motor.

Against this background, during the generation of the auxiliary signal it can be advantageous, e.g., to resort to a measure that is known as such with conventional active noise suppression systems. In an embodiment relevant to this, it is provided that the auxiliary signal is generated using a sound signal detected by means of a sound sensor.

The sound sensor can be arranged, e.g., in the vicinity of the electric motor or the electromechanical or electrohydraulic drive that is formed by it, in order to thus produce a sound sensor signal that is representative of the superimposition of the airborne sound components at the location of the sound sensor, which on the one hand are generated by the motor drive signal and on the other hand by the auxiliary signal, taking into account the transfer function from the electrical input of the electric motor to the location of the sound sensor. The sound sensor signal can then control or influence the generation of the auxiliary signal via feedback, so that the interference noise is minimized. In this way sound sensor signals originating from several sound sensors can also be used.

In some embodiments the auxiliary signal may be alternative or additionally generated using (at least) one vibration signal detected by means of a vibration sensor.

In this case, the (at least one) vibration sensor may be arranged on a component of the electric motor, such as, for example, a housing section of the motor or a bearing section for supporting a rotor of the motor. Alternatively or additionally, at least one vibration sensor can also be arranged in the vicinity of a gearbox of an electromechanical drive arranged after the electric motor. As previously explained for the sound sensor signal or signals, a detected vibration signal can likewise be used in the context of feedback for controlling the generation of the auxiliary signal and thus for regulated minimization of the interfering noise.

In situations in which the interfering frequencies are known previously, feedback can sometimes be completely dispensed with.

In this respect, it is alternatively or additionally also possible in the context of certain embodiments, e.g., that the auxiliary signal is generated using the motor drive signal and/or a signal correlated with it. If, for example, the motor drive signal reaching the motor is provided as a PWM (pulse width modulated) voltage signal, a signal correlated with it can e.g. be formed from a drive signal (input signal) of a PWM driver (e.g. inverter), which generates the PWM motor drive signal.

Such an embodiment may provide that at least partial compensation of the interfering noise takes place as early as "at the electrical level" as it were, before the interfering noise exists at all (first as a vibration or sound in solids and then as airborne sound).

For practical implementation of this measure, a controller may be provided, which generates an auxiliary signal suitable for reducing the noise generated by the motor operation, based on the motor drive signal or the signal correlated with it and using a defined algorithm (e.g. program controlled). An algorithm suitable for this can be previously determined, e.g., using a suitable mathematical model of the interfering noise generation and/or in an experimental manner.

In one embodiment it is provided that the motor is a DC motor and/or the motor drive signal is generated as a PWM drive voltage.

Especially when a PWM drive voltage is provided, the motor drive signal or a signal correlated with it can be used or taken into account during the generation of the auxiliary signal. A PWM signal generally includes a time sequence of PWM pulses, whose rising edges are e.g. arranged equidistant in time.

During the operation of rotating electric motors there is often unavoidably an interfering noise at an integral or non-integral multiple of the motor revolution rate. Through mechanical resonances, in particular close to the mechanical components of the motor or the electromechanical or electrohydraulic drive formed by it, further vibration sound frequencies and thus disturbance sound frequencies can be generated.

Once such mechanisms of disturbing sound generation are known or can be determined for each specific construction by modeling and/or experimentally, a suitable auxiliary signal can then be readily generated with knowledge of the PWM motor drive signal or generally the parameters of a current PWM drive. An auxiliary signal is often useful which comprises, for example, a dominant frequency component at the motor revolution rate. With the superimposition of the auxiliary signal and the motor drive signal, e.g., in a simple additive superimposition of voltage signals, the auxiliary signal must be superimposed with the appropriate phase (e.g., phase shifted relative to the revolution rate signal). If using the motor drive signal or a signal correlated with it, alternatively or additionally also using certain motor operating parameters, such as the already mentioned motor revolution rate, a motor torque and/or similar, information relating to expected stimulated vibration frequencies can be determined, the stimulation of such vibrations can be counteracted by controlled generation of the auxiliary signal with at least one of these frequencies. For example, a PWM drive voltage of a motor driver at such interfering frequencies (or a multiple thereof) can be modulated by the auxiliary signal (with suitable amplitude and phase), in order to inhibit the formation of at least one such resonance or to at least strongly reduce it.

For implementing a method of the type described above, an apparatus for operating an electric motor may comprise:
- a drive device for generating a motor drive signal, in particular a PWM voltage,
- a drive path for transferring the motor drive signal to a motor driver (or directly to a motor),
- a controller for generating an auxiliary signal and
- a superimposition device arranged in the drive path for superimposing the motor control signal and the auxiliary signal.

According to another aspect, an adjustment arrangement for operating an automatically operable vehicle component, such as a vehicle window, sliding roof, external mirror etc. may be provided with an apparatus as described herein.

FIG. 1 illustrates a system 10 for operating an electric motor 12, which together with a mechanical gearbox 14 connected after it forms an electromechanical drive for an automatically operable vehicle component, such as e.g. a vehicle window, a sliding roof, an external mirror, a vehicle seat, a trunk lid etc. (not shown). Alternatively, the illustrated components 12 and 14 can also represent e.g. an electropneumatic or electrohydraulic drive of a vehicle component.

The system comprises a first controller 16, e.g. a microcontroller, which generates a driver drive signal W for driving a power amplifier or PWM driver 18.

Based on the drive signal W, the driver 18 generates a PWM motor drive signal (voltage signal) Up, which is transferred to the motor 12. In the illustrated embodiment, the drive signal W is an analog voltage signal, whose value defines the duty cycle of the signal Up to be output by the PWM driver 18. The drive signal W is, however, not fed directly to the input of the driver 18, but as a signal S, which is formed by superposition in a drive path 20 between the controller 16 and the driver 18, which will be discussed further in detail below.

A motor armature current Ia is flowing, which is converted into a driving torque at a rotor of the motor 12, which in this case is e.g. in the form of a DC motor; said driving torque opposes a load torque and thus causes a rotary motion. The torque or the rotary motion is transferred to an input of the gearbox 14. Mechanical vibrations are generated in the vicinity of this mechanical transfer path and in the vicinity of the coupling of a load torque Ml to the relevant (not shown) vehicle component. Said generation is symbolized in FIG. 1 by Block 22. The vibration itself is represented by a vibration acceleration "av".

The vibration av leads inevitably to sound generation (symbolized by Block 24) and thus to a noise generated by the motor operation (symbolized by an acoustic pressure Pv). Such noise Pv is perceived as disturbing by the passengers of the vehicle involved.

It is often a characteristic of the noise development that discrete lines in the stimulation spectrum, e.g. caused by load torque fluctuations of the electric motor or the coupled mechanical apparatus, are amplified at another position in the drive by resonance and output as airborne sound or sound in solids.

Additional components of the system 10 are described below as examples, with which a reduction of the disturbance noise Pv is achieved in the illustrated embodiment.

A second controller 26 is essential for this noise reduction (which could be implemented by the first controller 16 or a functional part thereof), which generates an auxiliary signal Us (voltage) and outputs it to a summation node 28 arranged in the drive path 20, so that the auxiliary signal Us is additively superimposed on the motor drive signal W at this summation node 28 and the signal S resulting from this superimposition is fed to the electric motor 12 via the PWM driver stage 18.

In the illustrated embodiment, the resulting signal S is a DC voltage signal W proportional to the effective motor voltage, on which an AC voltage signal Us with significantly smaller amplitude is superimposed.

The resulting motor drive signal Up passing to the motor 12, which is generated by the PWM driver 18, thus includes a PWM—voltage signal, whose duty cycle or pulse pause ratio is proportional to W, but is modulated in pulse width in proportion to Us.

The amplitude of Us may be less than 20% of the amplitude of S, and thus the modulation amplitude of the PWM signal, which is proportional to Us, is likewise less than 20%.

The generation of the auxiliary signal Us suitable for reducing the disturbance noise takes place in the illustrated embodiment as follows:

The noise Pv emitted by the electromechanical drive is detected by a microphone 30 that may be arranged in the immediate vicinity of the drive and subjected as a microphone signal to filtering by an (active or passive) filter 32. The resulting low pass filtered signal is input to the controller 26, which generates the auxiliary signal Us based on this input signal.

As shown in dashed lines in FIG. 1, during this generation of the auxiliary signal Us, a sensor signal representative of the vibration av and/or a signal correlated with the motor drive signal W can be used alternatively or additionally. A vibration sensor can be used for this within the electromechanical drive, for example.

In summary, an already present motor driver (in this case: PWM controller) is thus used with the system 10, with which a mechanism is driven from the motor drive signal Up (or W), which finally produces a vibration acceleration av that is partly converted into an acoustic pressure Pv. The microphone 30 is used to convert the acoustic pressure Pv of the interfering vibration into an electrical signal, which may then be filtered and fed to the controller 26 as a digital signal, e.g., in analog-to-digital converted form.

The controller 26 can in particular be designed to implement a suitable adaptive control algorithm (in particular a digital control algorithm), as is known, for example, as such or at least in similar form, from the field of conventional active noise cancellation systems (ANC systems). The typical known ANC algorithms operate quasi-linearly: only one interfering component is combated by superimposing a frequency. In some embodiments, such algorithms can, however, be used advantageously in modified form, so that contrasting and improving nonlinear forms are conceivable, with which, alternatively or additionally, harmonics and sub-harmonics of a disturbing component can be suitably influenced, whilst applying (PWM) control, e.g., at yet another frequency.

In particular, the control algorithm can be designed to minimize the mean power of the input signal fed to the controller 26 in a defined spectral range, so that the acoustic pressure Pv and the associated vibration stimulation in this spectral range are also minimized.

For the specific design of the control algorithm to be used, it is useful to start, at least "to a first approximation", from a typical conventional control algorithm, such as e.g. the so-called LMS ("least mean square") algorithm or its modifications (e.g. Filtered-X LMS or RLS etc.), as also used in conventional active noise reduction systems. Some embodiments utilize a non-linear learning algorithm.

As already explained, alternatively to the acoustic pressure Pv of the interfering noise, the vibration functionally linked to the noise can already be detected and fed to the controller 26 or to the filter formed by it.

With regard to the above-mentioned possibility of using the motor drive signal W for the generation of the auxiliary signal Us, the following implementation is possible, for example: by an experimental reference measurement of the interfering noise depending on a plurality of possible motor drive signals W, and subsequent determination of a respective auxiliary signal Us suitable for noise suppression, a suitable control algorithm can be identified and, e.g., programmed into a controller 26 in the form of a microcontroller or microcontroller functionality. Such an algorithm then provides the respective suitable generation of the auxiliary signal Us during actual motor operation. It is in principle conceivable that sensor signals such as a microphone signal or vibration sensor signal can be dispensed with entirely.

The suitable auxiliary signal Us can especially be generated by a certain number of spectral Fourier components, each with a fixed magnitude and fixed phase, in order thus to achieve a noise reduction without having to measure and evaluate the interfering noise during motor operation. The magnitudes and phases of the Fourier components can be varied, e.g. depending on the motor drive signal or on a signal correlated with it (e.g. a driver drive signal S or one or more operating parameters of motor operation).

A control algorithm of this type provided independently of an actual noise measurement during motor operation is explained below with reference to FIGS. 2 and 3.

Figure 2:
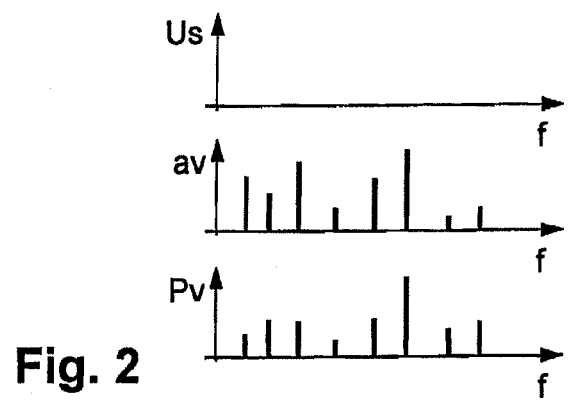

FIG. 2 shows by way of example frequency spectra of the vibration av arising during motor operation and the interfering noise Pv resulting from it with deactivated noise reduction (or for a system without the above explained components for noise reduction). The motor drive results in a series of stimulated vibration resonances at whose frequencies there are therefore also significant lines in the spectrum of the interfering noise Pv.

Figure 3:
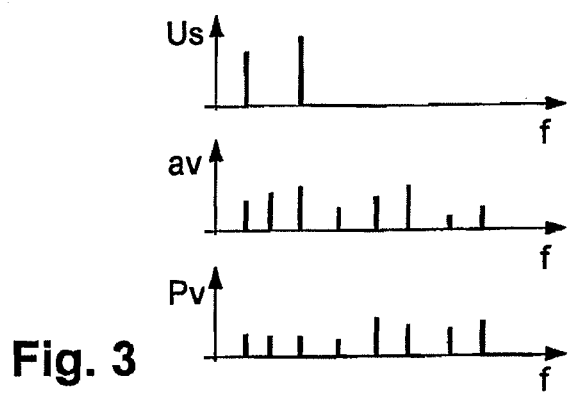

FIG. 3 shows the situation with activated noise reduction in an illustration corresponding to FIG. 2. Here the controller 26 forms the auxiliary signal Us based on the input signals, which in the example illustrated includes two discrete lines in the frequency spectrum. The superimposition of this auxiliary signal Us in the motor driver especially results in a reduction of the corresponding lines in the stimulation spectrum of the vibration av. This in turn also reduces the stimulation of other lines in the spectrum of the vibration av. This effect illustrates the generally non-linear system behavior (transfer function from Us to av). The reduction of other lines in the vibration spectrum relates in the illustrated example especially to integral multiples (harmonics) of the two frequencies concerned. This consequently finally also results in a significant reduction of a plurality of lines in the spectrum of the interfering noise Pv.

Finally it is to be noted that with systems according to the invention of the type described above, in contrast to a conventional ANC system, in which the interfering sound arises first and is only then attenuated by superimposition with the antinoise wave, the vibration can already be at least partly compensated as it arises by an anti-vibration. Moreover, suppression as early as the emergence of a mechanical vibration is also advantageously possible.

LIST OF REFERENCE NUMERALS 10 system
12 electric motor
14 gearbox
16 controller
18 PWM driver
20 drive path
22 vibration generation
24 sound generation
26 controller
28 summation node
30 microphone
32 filter
Up motor drive signal
Us auxiliary signal
av vibration acceleration
Pv acoustic pressure
f frequency

What is claimed is:

1. A method of operating an electric motor, comprising:
generating and transferring a motor drive signal to the motor or to a motor driver;
operating the motor based on the motor drive signal, wherein the motor operation generates a vibration having a frequency spectra defining a plurality of vibration amplitude spikes at a plurality of discrete frequencies,
providing a controlled compensation of interference noise generated by the motor by:
generating an auxiliary signal for antinoise, the auxiliary signal including a plurality of amplitude spikes at a plurality of discrete, separated frequencies, each corresponding to the frequency of a respective one of the plurality of vibration amplitude spikes; and
superimposing the auxiliary signal for antinoise on the motor drive signal during the transfer of the motor drive signal to the motor or to the motor driver.

2. The method of claim 1, whereby the auxiliary signal is generated using a sound signal detected by means of a sound sensor.

3. The method of claim 1, wherein the auxiliary signal is generated using a vibration signal detected by means of a vibration sensor.

4. The method of claim 1, wherein the auxiliary signal is generated using at least one of the motor drive signal and a signal correlated with it.

5. The method of claim 4, comprising varying the manner of using the motor drive signal or the signal correlated with it during the generation of the auxiliary signal based on at least one motor operating parameter.

6. The method of claim 1, wherein the motor is a DC motor.

7. The method of claim 1, comprising transferring the motor drive signal to a PWM motor driver, which generates a PWM voltage to be transferred to the motor based on the motor drive signal.

8. The method of claim 1, comprising generating the auxiliary antinoise signal without the use of a sound or vibration sensing device.

9. The method of claim 1, wherein the plurality of amplitude spikes in the auxiliary antinoise signal comprises a subset of the plurality of vibration amplitude spikes.

10. An apparatus for operating an electric motor, comprising:
   a drive device configured to generate a motor drive signal and a drive path for transferring the motor drive signal to an electric motor or to a motor driver, such that the motor is operated based on the motor drive signal, wherein the motor operation generates a vibration having a frequency spectra defining a plurality of vibration amplitude spikes at a plurality of discrete frequencies,
   a controller configured to generate an auxiliary signal including a plurality of amplitude spikes at a plurality of discrete, separated frequencies, each corresponding to the frequency of a respective one of the plurality of vibration amplitude spikes, and
   a superimposition device arranged in the drive path and configured to superimpose the auxiliary antinoise signal onto the motor drive signal.

11. The apparatus of claim 10, further comprising a sensor configured to detect a sound signal, wherein the controller generates the auxiliary antinoise signal based on the detected sound signal.

12. The apparatus of claim 10, further comprising a vibration sensor configured to detect a vibration signal, wherein the controller generates the auxiliary antinoise signal based on the detected vibration signal.

13. The apparatus of claim 10, wherein the auxiliary antinoise signal is generated using at least one of the motor drive signal and a signal correlated with it.

14. The apparatus of claim 13, wherein the manner of using the motor drive signal or the signal correlated with it during the generation of the auxiliary antinoise signal is varied depending on at least one motor operating parameter.

15. The apparatus of claim 10, wherein the motor is a DC motor.

16. The apparatus of claim 10, further comprising a PWM motor driver configured to receive the motor drive signal and generates from the motor drive signal a PWM voltage to be transferred to the motor.

17. The apparatus of claim 10, wherein the auxiliary antinoise signal is generated without the use of a sound or vibration sensing device.

18. An adjustment arrangement for a vehicle, comprising:
   an automatically operable vehicle component;
   an electric motor that interacts mechanically with the vehicle component; and
   an apparatus for driving the electric motor and comprising:
      a drive device configured to generate a motor drive signal and a drive path for transferring the motor drive signal to an electric motor or to a motor driver, such that the motor is operated based on the motor drive signal, wherein the motor operation generates a vibration having a frequency spectra defining a plurality of vibration amplitude spikes at a plurality of discrete frequencies,
      a controller configured to generate an auxiliary signal including a plurality of amplitude spikes at a plurality of discrete, separated frequencies, each corresponding to the frequency of a respective one of the plurality of vibration amplitude spikes, and
      a superimposition device arranged in the drive path and configured to superimpose the auxiliary signal onto the motor drive signal.

* * * * *